(12) United States Patent
Kamiya et al.

(10) Patent No.: US 12,196,130 B2
(45) Date of Patent: Jan. 14, 2025

(54) GAS TURBINE COMBUSTOR

(71) Applicant: KAWASAKI JUKOGYO KABUSHIKI KAISHA, Kobe (JP)

(72) Inventors: Hiromu Kamiya, Kobe (JP); Yoshichika Sato, Kobe (JP); Atsushi Horikawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/564,685

(22) PCT Filed: May 31, 2022

(86) PCT No.: PCT/JP2022/022050
§ 371 (c)(1),
(2) Date: Nov. 28, 2023

(87) PCT Pub. No.: WO2022/255334
PCT Pub. Date: Dec. 8, 2022

(65) Prior Publication Data
US 2024/0254916 A1 Aug. 1, 2024

(30) Foreign Application Priority Data
May 31, 2021 (JP) .................................. 2021-091370

(51) Int. Cl.
*F23R 3/16* (2006.01)
*F02C 5/10* (2006.01)
*F23M 20/00* (2014.01)

(52) U.S. Cl.
CPC ............. *F02C 5/10* (2013.01); *F23M 20/005* (2015.01); *F23R 3/16* (2013.01); *F05D 2240/35* (2013.01);
(Continued)

(58) Field of Classification Search
CPC ............ F23R 2900/00014; F23R 3/002; F05D 2260/96; F23M 20/005
See application file for complete search history.

(56) References Cited

U.S. PATENT DOCUMENTS 6,164,058 A * 12/2000 Dobbeling .............. F02C 7/045
60/725
6,530,221 B1 3/2003 Sattinger et al.
(Continued)

FOREIGN PATENT DOCUMENTS

JP 2004-509313 A 3/2004
JP 2004-183944 A 7/2004
(Continued)

*Primary Examiner* — Gerald L Sung
(74) *Attorney, Agent, or Firm* — Oliff PLC

(57) ABSTRACT

A gas turbine combustor includes: a tubular body; an air passage; and a resonator. The air passage includes: an upstream region that extends along an outer peripheral surface of the tubular body; a downstream region that extends along an inner peripheral surface of the tubular body and is located at a first side of the combustion chamber in the axial direction; and a direction change region that connects the upstream region to the downstream region in a radial direction of the tubular body and is adjacent to the upstream region such that an area of a section of the air passage which is orthogonal to the axial direction changes at a position between the upstream region and the direction change region. The opening is open toward a space of the air passage which is located downstream of the upstream region.

12 Claims, 12 Drawing Sheets

(52) U.S. Cl.
    CPC  *F05D 2260/96* (2013.01); *F23R 2900/00014* (2013.01)

(56) References Cited

U.S. PATENT DOCUMENTS

| | | |
|---|---|---|
| 2005/0223707 A1 | 10/2005 | Ikeda et al. |
| 2011/0165527 A1 | 7/2011 | Kim et al. |
| 2013/0019602 A1 | 1/2013 | Kim et al. |
| 2013/0291543 A1 | 11/2013 | Kim et al. |
| 2016/0146467 A1* | 5/2016 | Eroglu ............... F23R 3/44 60/776 |
| 2019/0368730 A1 | 12/2019 | Fujimoto et al. |
| 2020/0025381 A1* | 1/2020 | Roh .................. F02C 7/22 |

FOREIGN PATENT DOCUMENTS

| | | |
|---|---|---|
| JP | 2011-141110 A | 7/2011 |
| JP | 2013-234833 A | 11/2013 |
| JP | 2018-159533 A | 10/2018 |

\* cited by examiner

GAS TURBINE COMBUSTOR

CROSS-REFERENCE TO RELATED APPLICATIONS

This is a U.S. National Phase Application of PCT/JP2022/022050 filed on May 31, 2022, which designates the United States and claims priority to Japanese Patent Application No. 2021-091370, filed on May 31, 2021, the entire contents of which are incorporated herein by reference.

TECHNICAL FIELD

The present disclosure relates to a combustor of a gas turbine engine.

BACKGROUND ART

A gas turbine combustor on which a resonator is mounted to reduce vibration generated by combustion has been known. In PTL 1, the resonator is attached to a combustion liner defining a combustion chamber, and a resonance chamber of the resonator is open toward the combustion chamber. In PTL 2, the resonator is attached to a flow sleeve located at a radially outer side of the combustion liner defining the combustion chamber, and the resonance chamber of the resonator is open toward an air passage defined by the flow sleeve.

CITATION LIST

Patent Literature

PTL 1: Japanese Laid-Open Patent Application Publication No. 2018-159533
PTL 2: Japanese Laid-Open Patent Application Publication No. 2013-234833

SUMMARY OF INVENTION

Technical Problem

According to the configuration of PTL 1, heat of the combustion chamber is directly transferred to the resonance chamber, and the resonator becomes high in temperature. When the resonator is specially cooled, and the combustion temperature is increased by a temperature corresponding to the cooling of the resonator, NOx may increase. According to the configuration of PTL 2, the heat transferred from the combustion chamber to the resonator is reduced, but there is still room for improvement in terms of vibration reduction.

Solution to Problem

A gas turbine combustor according to one aspect of the present disclosure includes: a tubular body that defines a combustion chamber, extends from a first side to a second side in an axial direction, and defines a discharge port located at the second side in the axial direction; an air passage through which air is supplied to the combustion chamber; and at least one resonator including at least one opening that is open toward the air passage. The air passage includes: an upstream region that extends along an outer peripheral surface of the tubular body; a downstream region that extends along an inner peripheral surface of the tubular body, is located at the first side of the combustion chamber in the axial direction, and communicates with the combustion chamber; and a direction change region that connects the upstream region to the downstream region in a radial direction of the tubular body and is adjacent to the upstream region such that an area of a section of the air passage which is orthogonal to the axial direction changes at a position between the upstream region and the direction change region. The opening is open toward a space of the air passage which is located downstream of the upstream region.

A gas turbine combustor according to one aspect of the present disclosure includes: a tubular body that defines a combustion chamber, extends from a first side to a second side in an axial direction, and defines a discharge port located at the second side in the axial direction; and an air passage through which air is supplied to the combustion chamber. The air passage includes: an upstream region that extends along an outer peripheral surface of the tubular body; a downstream region that extends along an inner peripheral surface of the tubular body, is located at the first side of the combustion chamber in the axial direction, and communicates with the combustion chamber; and a direction change region that connects the upstream region to the downstream region in a radial direction of the tubular body. The tubular body includes a leak hole that makes the downstream region communicate with the upstream region without through the direction change region.

Advantageous Effects of Invention

According to one aspect of the present disclosure, a special cooling structure is not required, and vibration generated by combustion can be effectively reduced.

DESCRIPTION OF EMBODIMENTS

Hereinafter, embodiments will be described with reference to the drawings.

Figure 1:
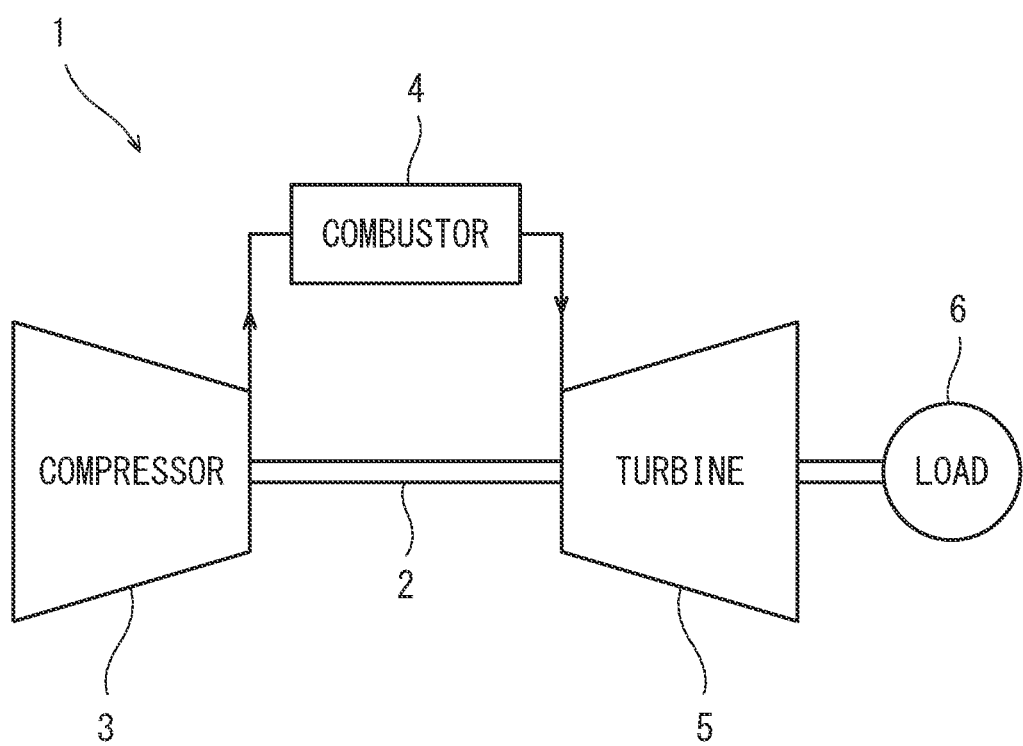
FIG. 1 is a schematic diagram of a gas turbine engine.

FIG. 1 is a schematic diagram of a gas turbine engine 1. As shown in FIG. 1, the gas turbine engine 1 (hereinafter referred to as a gas turbine) includes a rotating shaft 2, a compressor 3, a combustor 4, and a turbine 5. In the gas turbine 1, compressed air supplied from the compressor 3 is introduced to the combustor 4. In the combustor 4, a fuel-air mixture that is a mixture of fuel supplied from a fuel supply line and the compressed air supplied from the compressor 3 is combusted. The turbine 5 is driven by a high-temperature and high-pressure combustion gas discharged from the combustor 4. The turbine 5 is mechanically coupled to a load 6 (power generator, for example) and the compressor 3 through the rotating shaft 2.

Embodiment 1

Figure 2:
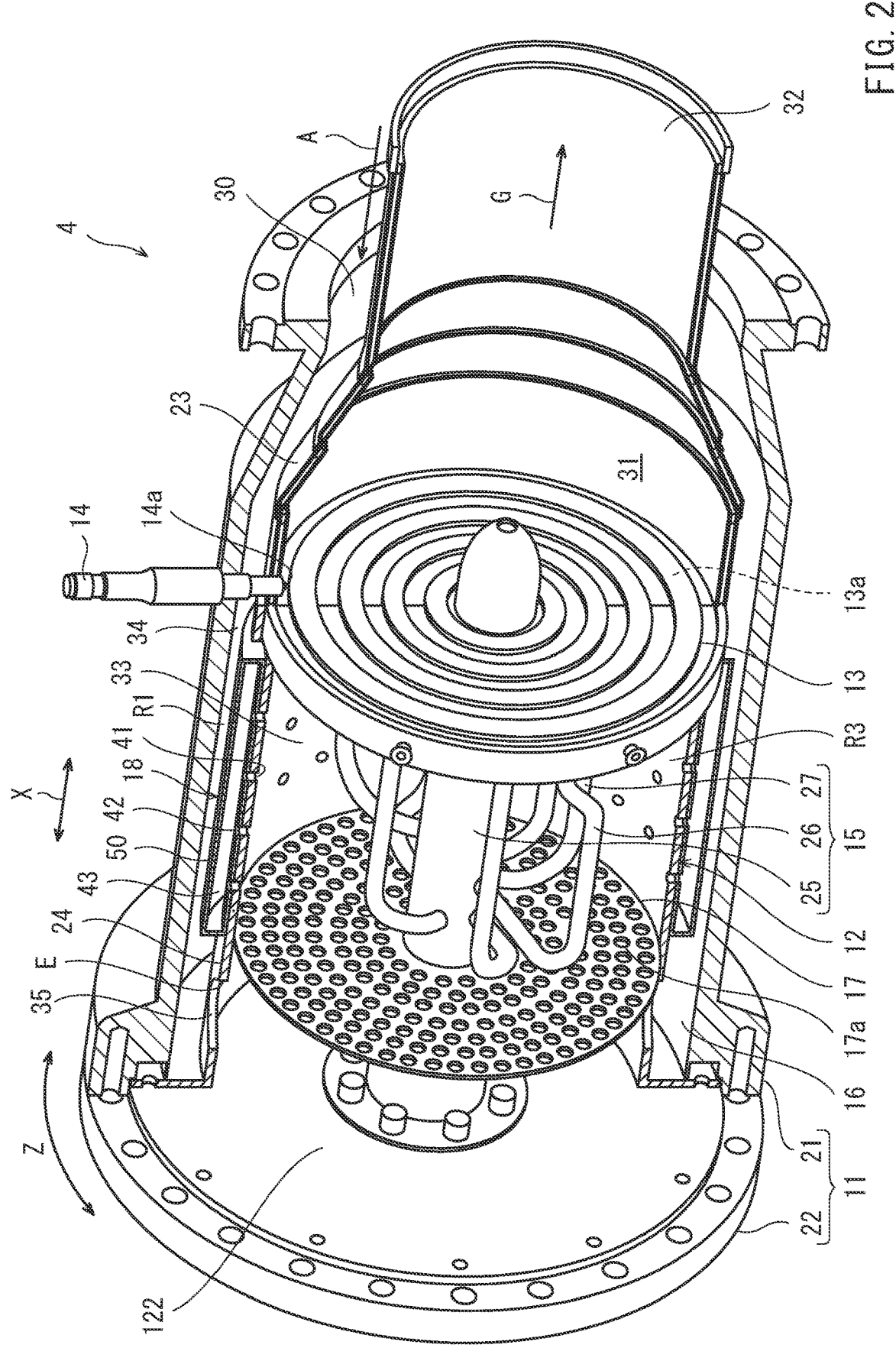
FIG. 2 is a sectional perspective view of a combustor of Embodiment 1.
Figure 3:
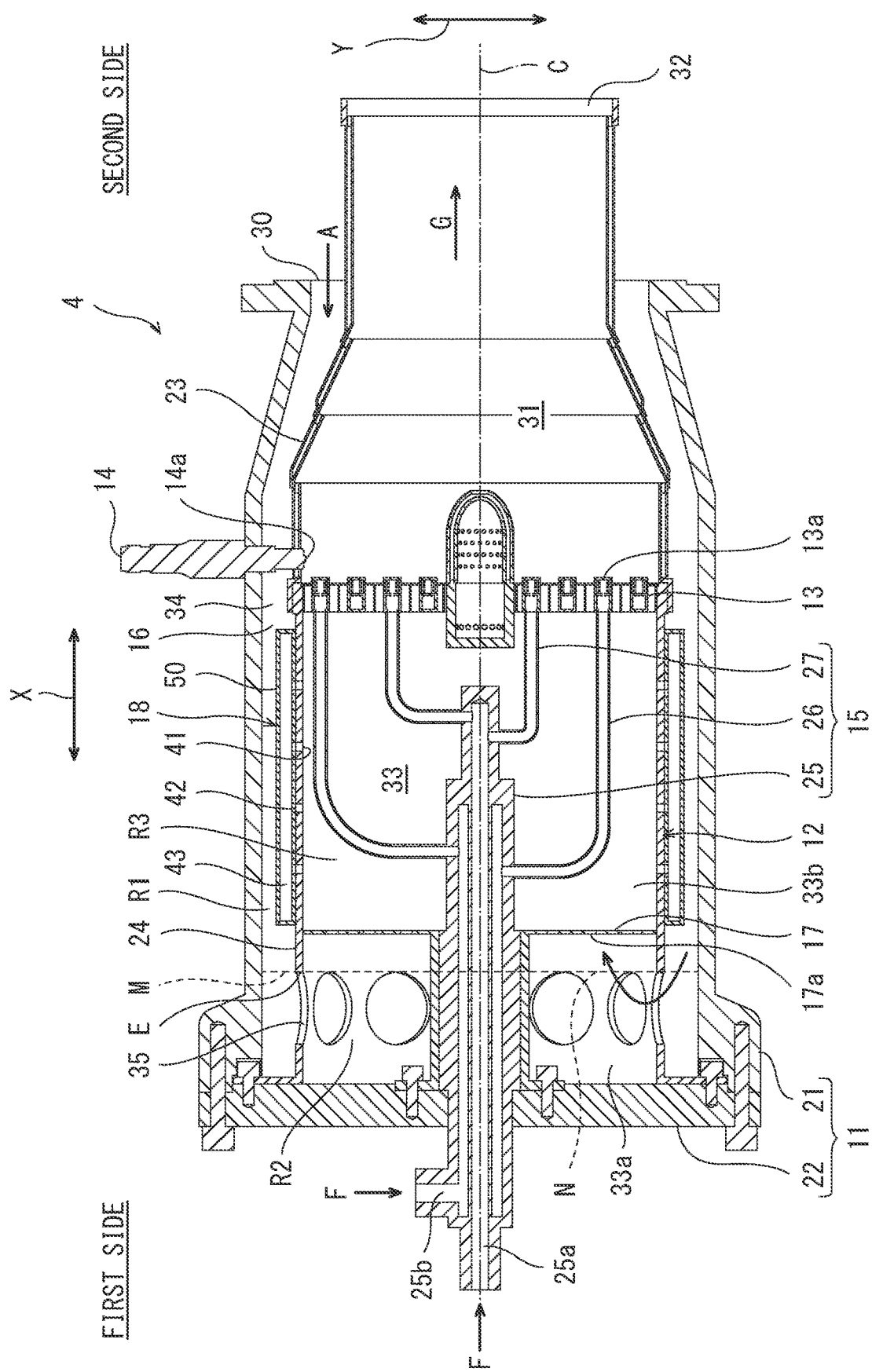
FIG. 3 is a sectional view of the combustor shown in FIG. 2.

FIG. 2 is a sectional perspective view of the combustor 4 of Embodiment 1. FIG. 3 is a sectional view of the combustor 4 shown in FIG. 2. In the following description, a direction in which an axis C of a casing 11 and a tubular body 12 extends is referred to as an "axial direction X." In the axial direction X, a side of the tubular body 12 which is opposite to a side where a discharge port 32 is located is referred to as a "first side," and the side where the discharge port 32 is located is referred to as a "second side." A direction orthogonal to the axial direction X is referred to as a "radial direction Y." A direction extending circumferentially around the axis C is referred to as a "circumferential direction Z."

The combustor 4 (also called a gas turbine combustor) is, for example, one of can-shaped combustors located in an annular shape around the rotating shaft 2 of the gas turbine 1 (see FIG. 2). The combustor 4 is not limited to this and may be applied to a gas turbine including only one combustor. As shown in FIGS. 2 and 3, the combustor 4 includes the casing 11, the tubular body 12, a fuel injector 13, an igniter 14, a fuel supply structure 15, an air passage 16, a straightening plate 17, and a resonator 18.

The casing 11 includes a tubular casing 21 and an end plate 22. The tubular casing 21 has a tubular shape and extends from the first side (left side in FIG. 3) to the second side (right side in FIG. 3) in the axial direction X. The tubular casing 21 includes an air inlet 30 that is open at the second side so as to receive air A from the compressor 3 (see FIG. 1). The end plate 22 is located at the first side of the tubular body 12 in the axial direction X and includes an inner surface facing the below-described air passage 16. The end plate 22 closes an opening of the tubular casing 21 which is located at the first side. The end plate 22 is fixed with a fastener to an end portion of the tubular casing 21 which is located at the first side.

The tubular body 12 is accommodated in the casing 11. The axis C of the tubular body 12 coincides with the axis of the casing 11. The tubular body 12 includes a combustion liner 23 as a first liner and a support liner 24 as a second liner. The combustion liner 23 defines therein a combustion chamber 31. The discharge port 32 of the combustion liner 23 is open toward the second side. The support liner 24 is adjacently located at the first side of the combustion liner 23 and is located coaxially with the combustion liner 23. The support liner 24 defines an air chamber 33 at its inside in the radial direction Y. Heat resistance of a material (for example, a cobalt alloy or a nickel alloy) of the combustion liner 23 is higher than heat resistance of a material (for example, stainless steel) of the support liner 24. The tubular body 12 may include only the combustion liner 23, and the support liner 24 may be omitted.

The fuel injector 13 is accommodated in the tubular body 12. The fuel injector 13 includes a fuel injection port 13a that is open toward the combustion chamber 31. The fuel injection port 13a injects fuel F, supplied from the below-described fuel supply structure 15, into the combustion chamber 31 together with the air A supplied from the air chamber 33. The fuel injector 13 is located at the first side of the combustion chamber 31 in the axial direction X. In the present embodiment, as an example, the fuel injector 13 is located so as to correspond to a boundary between the combustion liner 23 and the support liner 24, and separates the combustion chamber 31 and the air chamber 33.

The fuel F is gas fuel, such as a carbon-containing gas (a natural gas or a propane gas) or a hydrogen-containing gas (hydrogen gas), but may be liquid fuel. Moreover, the fuel F and the air A may be mixed with each other in advance and injected into the combustion chamber 31 as a fuel-air mixture or may be mixed with each other in the combustion chamber 31.

The igniter 14 penetrates the tubular casing 21 and the combustion liner 23 in the radial direction Y, and an ignition portion 14a of the igniter 14 is exposed to the combustion chamber 31. When starting the combustor 4, the fuel-air mixture injected from the fuel injector 13 into the combustion chamber 31 is ignited by the igniter 14, and this generates flame in the combustion chamber 31. A high-temperature and high-pressure combustion gas G generated in the combustion chamber 31 is discharged through the discharge port 32.

The fuel supply structure 15 may supply the fuel F, supplied from a fuel supply line located outside the casing 11, to the fuel injector 13. The configuration of the fuel supply structure 15 is not especially limited. In the present embodiment, as an example, the fuel supply structure 15 includes a main pipe 25 and branch pipes 26 and 27 extending from the main pipe 25.

The main pipe 25 penetrates the end plate 22 on the axis C of the tubular body 12 and extends in the axial direction X. One end portion of the main pipe 25 is located in the air chamber 33, and the other end portion of the main pipe 25 is located outside the casing 11. The main pipe 25 has a multiple pipe structure in which cylindrical pipes are located coaxially. Circular-tube fuel supply passages 25a and 25b are coaxially located inside the main pipe 25. The branch pipes 26 and 27 connect the main pipe 25 to the fuel injector 13. An inside of the branch pipe 26 communicates with a fuel supply passage 25a, and an inside of the branch pipe 27 communicates with a fuel supply passage 25b.

Each of the branch pipes 26 and 27 includes: a portion projecting outward in the radial direction Y from the main pipe 25; and a portion extending in the axial direction X toward the fuel injector 13. A position where the branch pipe 26 is connected to the fuel injector 13 in the radial direction Y and a position where the branch pipe 27 is connected to the fuel injector 13 in the radial direction Y are different from each other. The flow rates of the fuel F supplied to respective portions of the fuel injector 13 can be independently controlled by adjusting opening degrees of flow control valves that can adjust the flow rates of the fuel supply passages 25a and 25b.

The air passage 16 supplies the air A, supplied from the compressor 3 (see FIG. 1), to the combustion chamber 31. The air passage 16 has such a reverse flow shape as to extend from the air inlet 30 as a starting point toward the first side in the axial direction X and turn back toward the second side in the axial direction X.

The air passage 16 includes an air introduction passage 34 that is a gap between an inner peripheral surface of the casing 11 and an outer peripheral surface of the tubular body 12. The air A compressed by the compressor 3 (see FIG. 1) is introduced into the air introduction passage 34 through the air inlet 30, and the air introduction passage 34 guides the air A in a direction opposite to a flow direction of the combustion gas G in the combustion chamber 31. An axial flow gas turbine in which the flow direction of the air A and the flow direction of the combustion gas G are the same as each other may be used.

A portion of the support liner 24 which is located at the first side includes air introduction ports 35 lined up in the circumferential direction Z. However, an air introduction port of the support liner 24 may be such a large port as to include the air introduction ports 35. The air introduction ports 35 make the air introduction passage 34 communicate with the air chamber 33. The air A having flowed through the air introduction passage 34 flows through the air introduction ports 35 and is guided to the air chamber 33 located at an inside of the support liner 24 in the radial direction Y. The air A having guided to the air chamber 33 flows toward the fuel injector 13 and is mixed with the fuel F in the fuel injector 13.

The straightening plate 17 is located in the support liner 24 so as to be orthogonal to the axis C. The straightening plate 17 is located at the second side of the air introduction ports 35 in the axial direction X. An outer peripheral portion of the straightening plate 17 is fixed to the support liner 24. An inner peripheral portion of the straightening plate 17 is fixed to the end plate 22 through a tubular bracket externally fitted to the main pipe 25. The straightening plate 17 includes straightening holes 17a. The straightening plate 17 divides the air chamber 33 into two spaces lined up in the axial direction X. To be specific, the straightening plate 17 divides the air chamber 33 into a pre-straightening space 33a and a post-straightening space 33b.

The pre-straightening space 33a is a space located at the first side in the air chamber 33 and is adjacent to the air introduction ports 35. The post-straightening space 33b is a space located at the second side in the air chamber 33 and is adjacent to the fuel injector 13. The straightening plate 17 is located at the second side of the air introduction ports 35 in the axial direction X. The straightening plate 17 straightens the air A introduced from the air introduction ports 35 into the air chamber 33, to generate a uniform flow toward the combustion chamber 31. The straightening plate 17 may be omitted.

In the present embodiment, the air passage 16 is formed by the air introduction passage 34, the air introduction ports 35, and the air chamber 33. The air passage 16 can be divided into an upstream region R1, a direction change region R2, and a downstream region R3.

The upstream region R1 is located between the air inlet 30 and the air introduction ports 35 in the axial direction X and along the outer peripheral surface of the tubular body 12. The upstream region R1 is part of the air introduction passage 34. The downstream region R3 is located between the air introduction ports 35 and the fuel injector 13 in the axial direction X and along an inner peripheral surface of the tubular body 12. The downstream region R3 is part of the air chamber 33. The direction change region R2 connects the upstream region R1 to the downstream region R3.

The direction change region R2 is adjacent to the upstream region R1 such that the area of a section of the air passage 16 which is orthogonal to the axial direction X changes at a position between the upstream region R1 and the direction change region R2. A virtual boundary plane M between the upstream region R1 and the direction change region R2 is a virtual plane which passes through ends E, located at the second side in the axial direction X, of the air introduction ports 35 and is orthogonal to the axial direction X. To be specific, the virtual boundary plane M is a virtual plane which: passes through an end E, located at the second side in the axial direction X, of a portion of the air passage 16 which extends in the radial direction Y to connect the upstream region R1 to the downstream region R3; is orthogonal to the axial direction X; and is located outside the end E in the radial direction Y.

A virtual boundary plane N between the direction change region R2 and the downstream region R3 is also a virtual plane which passes through the ends E of the air introduction ports 35 and is orthogonal to the axial direction X. To be specific, the virtual boundary plane N is a virtual plane which: passes through the end E, located at the second side in the axial direction X, of the portion of the air passage 16 which extends in the radial direction Y to connect the upstream region R1 to the downstream region R3; is orthogonal to the axial direction X; and is located inside the end E in the radial direction Y. The straightening plate 17 is located in the downstream region R3.

The resonator 18 (first resonator) includes openings 41, restrictors 42, and a resonance chamber 43. The openings 41 are open so as to face a space (the direction change region R2 or the downstream region R3) of the air passage 16 which is located downstream of the virtual boundary plane M. In the present embodiment, the openings 41 directly face the downstream region R3 and are open toward the downstream region R3 on an inner peripheral surface of the support liner 24. The openings 41 are continuous with the downstream region R3. The resonator 18 utilizes part of the support liner 24. The restrictors 42 are passages that connect the openings 41 to the resonance chamber 43. The resonance chamber 43 is a space larger than the restrictors 42. The areas of the openings 41, the lengths of the restrictors 42, and the volume of the resonance chamber 43 are determined in accordance with a frequency to be attenuated. The support liner 24 may project outward in the radial direction Y, and the resonator 18 may be located inside this projecting portion in the radial direction Y. In this case, a plate including the openings 41 and the restrictors 42 is located between the downstream region R3 and the resonance chamber 43. To be specific, the inner peripheral surface of the support liner 24 utilizes a surface of the plate of the resonator 18 which is located at an inside in the radial direction Y.

The openings 41 of the resonator 18 are open toward the air passage 16 located upstream of the combustion chamber 31. Therefore, the temperature of an inside of the resonator 18 is lower than when the openings 41 are open toward the combustion chamber. Thus, the resonator 18 does not have to be specially cooled. Therefore, a special cooling structure is unnecessary. In addition, the combustion temperature does not have to be increased by a temperature corresponding to the cooling of the resonator 18. Thus, NOx can be prevented from increasing.

The area of the section of the air passage 16 which is orthogonal to the axial direction X changes at the boundary (virtual boundary plane M) between the upstream region R1 and the direction change region R2. Pressure waves that are transferred in the air so as to move backward in the air passage 16 from the combustion chamber 31 due to combustion vibration are partially reflected or canceled at a downstream side of the virtual boundary plane M. When pressure variation in the combustor 4 is simplified, and attention is focused on the transfer of the pressure waves generated in the combustion chamber 31, this reflection action causes such a tendency that sound pressure in a space of the air passage 16 which is located downstream of the upstream region R1 is made higher than sound pressure in the upstream region R1. Therefore, when the openings 41 are open toward the space of the air passage 16 which is located downstream of the upstream region R1, the pressure waves that are transferred in the air from the combustion chamber 31 to the air passage 16 can be effectively absorbed, and the vibration generated by the combustion can be reduced.

Figure 4:
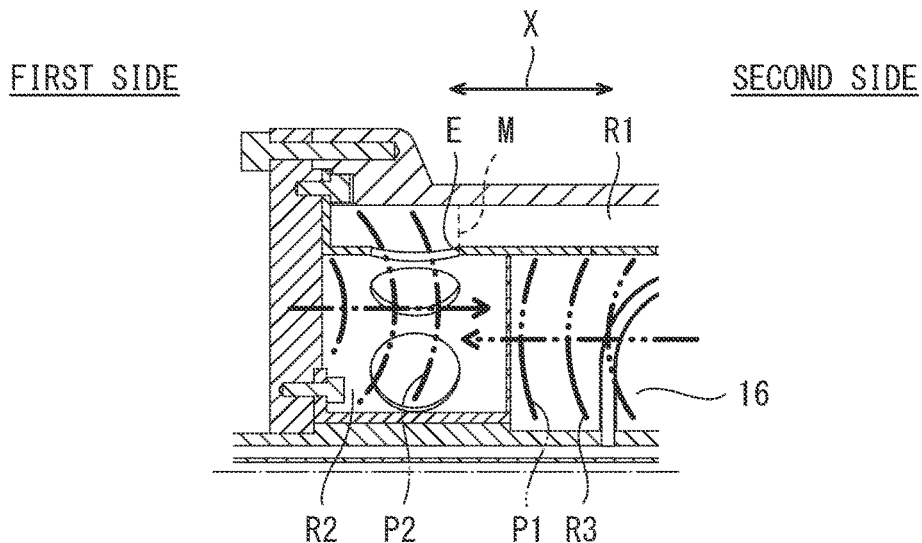
FIG. 4 is a diagram for explaining the propagation of low-frequency pressure waves in the combustor shown in FIG. 3.

FIG. 4 is a diagram for explaining the propagation of low-frequency pressure waves in the combustor 4 shown in FIG. 3. Referring to FIG. 4, the following will describe the pressure wave whose frequency is relatively low, i.e., the pressure wave whose wavelength can be regarded as long relative to the size of a propagation space. In this case, a pressure wave P1 that moves backward in the air passage 16 from the combustion chamber 31 moves in the axial direction X toward the first side and is reflected by a wall surface of the direction change region R2 at the first side in the axial direction X, and its reflected wave P2 moves in the axial direction X toward the second side. The reflected wave P2 is divided into components that are reflected by the ends E of the air introduction ports 35 and the other components. The components reflected by the wall surface remain in the direction change region R2. The components that are not reflected by the ends E are divided into components that move in the upstream region R1 and components that remain in the direction change region R2 and the downstream region R3. Therefore, the pressure wave that is propagated in the upstream region R1 is smaller than the pressure wave in the space located downstream of the virtual boundary plane M. To be specific, the sound pressure in the direction change region R2 and the downstream region R3 is larger than the sound pressure in the upstream region R1. Therefore, when the openings 41 are open toward the space of the air passage 16 which is located downstream of the upstream region R1, the pressure waves that are transferred in the air from the combustion chamber 31 to the air passage 16 can be effectively absorbed.

Figure 5:
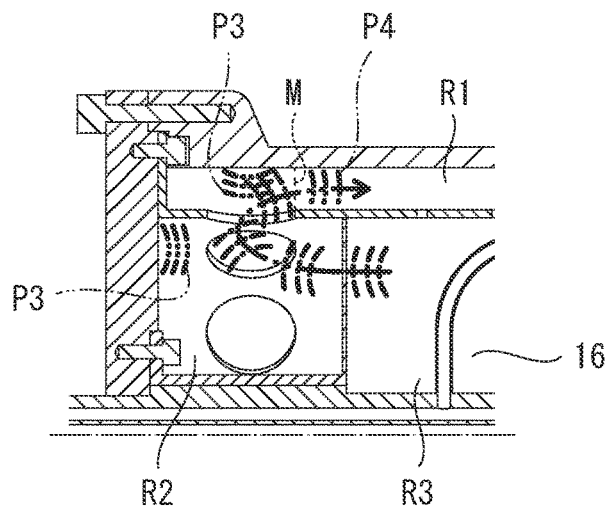
FIG. 5 is a diagram for explaining the propagation of high-frequency pressure waves in the combustor shown in FIG. 3.

FIG. 5 is a diagram for explaining the propagation of high-frequency pressure waves in the combustor 4 shown in FIG. 3. Referring to FIG. 5, the following will describe the pressure wave whose frequency is relatively high, i.e., the pressure wave whose wavelength can be regarded as short relative to the size of the propagation space. In this case, the pressure wave that moves backward in the air passage 16 from the combustion chamber 31 is divided into components P3 that are reflected by the wall surface of the direction change region R2 and components P4 that turn along a passage axis of the direction change region R2 and are transferred to the upstream region R1. The components P3 of the pressure wave which are reflected by the wall surface of the direction change region R2 remain in the direction change region R2 and the downstream region R3 (some of the components P3 may be transferred to the upstream region R1). Therefore, the sound pressure in the direction change region R2 and the downstream region R3 is larger than the sound pressure in the upstream region R1. Thus, when the openings 41 are open toward the space of the air passage 16 which is located downstream of the upstream region R1, the pressure waves that are transferred in the air from the combustion chamber 31 to the air passage 16 can be effectively absorbed.

Figure 6:
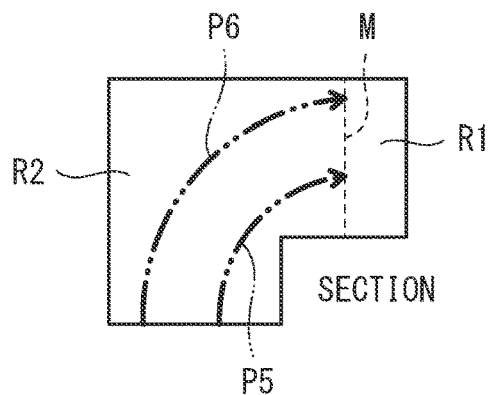
FIG. 6 is a diagram for explaining a difference between routes of the propagation of the pressure waves in a direction change region shown in FIG. 3.

FIG. 6 is a diagram for explaining a difference between routes of the propagation of the pressure waves in the direction change region R2 shown in FIG. 3. As shown in FIG. 6, when the pressure wave is propagated in a curved passage of the direction change region R2, a difference is generated between an inner circumferential route P5 and an outer circumferential route P6 in the curved passage. There is a difference between the phase of the pressure wave passing through the inner circumferential route P5 and the phase of the pressure wave passing through the outer circumferential route P6. At the virtual boundary plane M, the pressure waves partially cancel each other by interference in which the pressure waves whose phases are different from each other overlap each other. Therefore, the sound pressure in the direction change region R2 and the downstream region R3 is larger than the sound pressure in the upstream region R1. Thus, when the openings 41 are open toward the space of the air passage 16 which is located downstream of the upstream region R1, the pressure waves that are transferred in the air from the combustion chamber 31 to the air passage 16 can be effectively absorbed.

Specifically, the openings 41 of the resonator 18 face the downstream region R3 and are open toward the downstream region R3. The area of the passage section of the air passage 16 which is orthogonal to the axial direction X changes also at the virtual boundary plane N between the direction change region R2 and the downstream region R3. The downstream region R3 is closer to the combustion chamber 31 than the direction change region R2. Therefore, when the openings 41 of the resonator 18 are open toward the downstream region R3, the pressure waves can be further effectively absorbed.

More specifically, the openings 41 of the resonator 18 face the post-straightening space 33b and are open toward the post-straightening space 33b. The area of the passage section of the air passage 16 which is orthogonal to the axial direction X changes also at the straightening holes 17a of the straightening plate 17, and partial reflection of the pressure waves occurs at the straightening plate 17. Therefore, when the openings 41 of the resonator 18 are open toward the post-straightening space 33b, the pressure waves can be further effectively absorbed.

Since the resonator 18 is open toward the air passage 16 through which only air flows, the gas introduced to the resonator 18 is not a fuel-containing gas, such as a fuel-air mixture. A fuel content rate of the fuel-air mixture changes in accordance with an engine output, and a sound speed is changed in accordance with this change. Therefore, regarding the fuel-air mixture, it is difficult to design a resonance frequency. Since the resonator 18 is open toward the air passage 16, it is possible to avoid such problem. The fuel-air mixture containing air and fuel may flow through the air passage 16.

The resonator 18 is accommodated in the casing 11 and located at the support liner 24. The resonator 18 includes, for example, a resonator main body 50 fitted to an outer peripheral surface of the support liner 24. The resonator 18 is formed by the resonator main body 50 and part of the support liner 24. The resonator main body 50 is a cylindrical hollow member. The restrictors 42 are through holes located at an inner peripheral wall of the resonator main body 50 and the support liner 24.

The length of the restrictor 42 in the radial direction Y can be determined by the thickness of the inner peripheral wall of the resonator main body 50. The openings 41 are openings of the above through holes of the support liner 24 which are located at an inside in the radial direction Y. The openings 41 are lined up in the axial direction X and the circumferential direction Z. All the openings 41 and the restrictors 42 communicate with one resonance chamber 43. However, the present embodiment is not limited to this. The resonance chamber 43 may be divided into cavities.

The resonator 18 may be located on part of the outer peripheral surface of the support liner 24 in the the circumferential direction Z without being located on the entire outer peripheral surface of the support liner 24 in the the circumferential direction Z. The resonator main body 50 does not have to be a hollow member and may be a cover member (the resonator main body 50 from which the inner peripheral wall is omitted) which covers the outer peripheral surface of the support liner 24. In this case, a gap between an inner peripheral surface of the cover member and the outer peripheral surface of the support liner 24 may be used as the resonance chamber 43.

The resonator 18 projects toward the upstream region R1 more than a portion of the support liner 24 which is adjacent to the resonator 18 in the axial direction X. To be specific, an outer peripheral surface of the resonator 18 is located, in the radial direction Y, outside an outer peripheral surface of the portion of the support liner 24 which is adjacent to the resonator 18 in the axial direction X. In the present embodiment, the resonator main body 50 externally fitted to the support liner 24 is located so as to project from the support liner 24 toward the upstream region R1. The inner peripheral surface of the support liner 24 extends linearly in the axial direction X. Therefore, even when the resonator 18 is located at the support liner 24, the air chamber 33 can be made large. An outer surface of the resonator 18 which faces the upstream region R1 may have such a streamline shape as to gradually decrease in diameter toward both sides in the axial direction X.

Figure 7A:
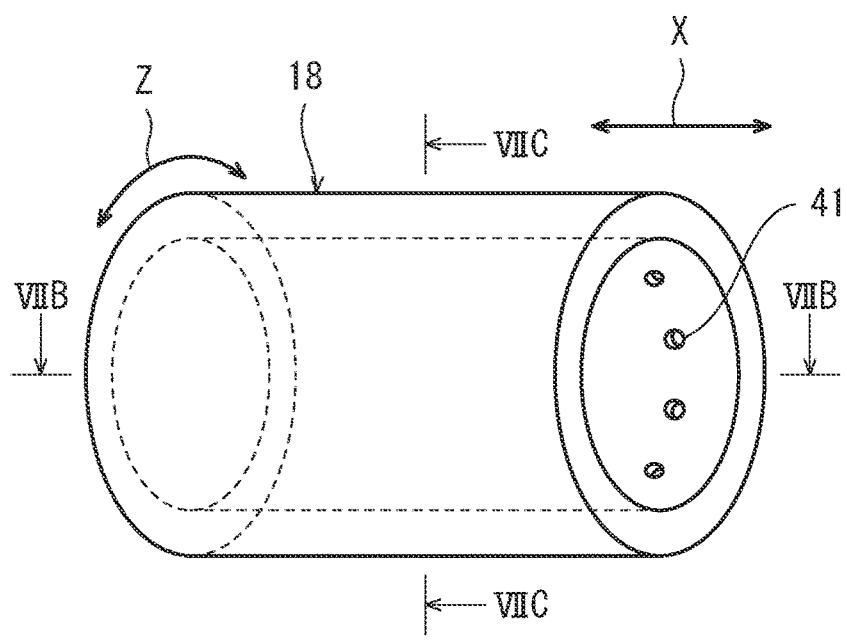
FIG. 7A is a perspective view showing a modified example of a resonator shown in FIG. 3.
Figure 7B:
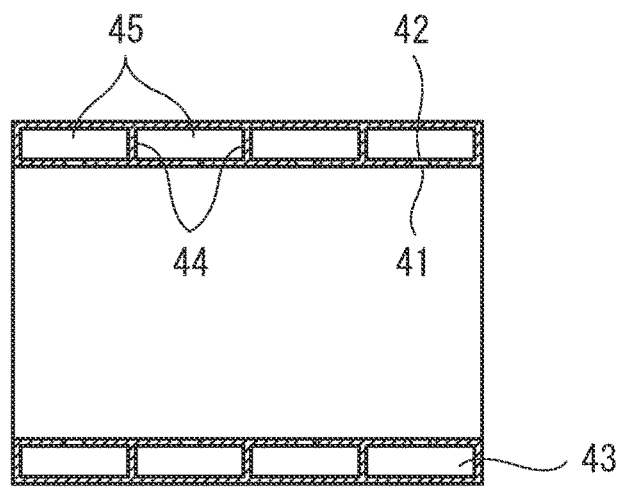
FIG. 7B is a sectional view taken along line VIIB-VIIB of FIG. 7A.
Figure 7C:
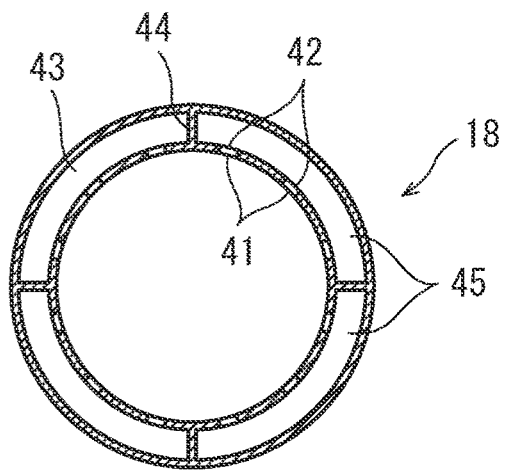
FIG. 7C is a sectional view taken along line VIIC-VIIC of FIG. 7A.

FIG. 7A is a perspective view showing a modified example of the resonator 18 shown in FIG. 3. FIG. 7B is a sectional view taken along line VIIB-VIIB of FIG. 7A. FIG. 7C is a sectional view taken along line VIIC-VIIC of FIG. 7A. As shown in FIGS. 7A to 7C, the resonator 18 may include a partition plate 44 that divides the resonance chamber 43 into cavities 45. The cavities 45 communicate with the respective openings 41.

The partition plate 44 divides the resonance chamber 43 in both of the axial direction X and the circumferential direction Z. Specifically, the partition plate 44 includes portions extending in the axial direction X and portions extending in the circumferential direction Z. One opening 41 may communicate with one cavity 45, or the openings 41 may communicate with one cavity 45. In a development view seen from the radial direction Y, the partition plate 44 may have such a shape that each cavity 45 has a polygonal shape (such as a quadrangular shape or a hexagonal shape) or a circular shape.

According to this, even when the sound pressures whose phases are opposite to each other are distributed in both of the axial direction X and the circumferential direction Z, the sound pressures whose phases are opposite to each other are prevented from interfering with each other. Therefore, a reduction in resonance volume by the interference of the sound pressures can be prevented, and resonance at a designed frequency can be generated.

Figure 8A:
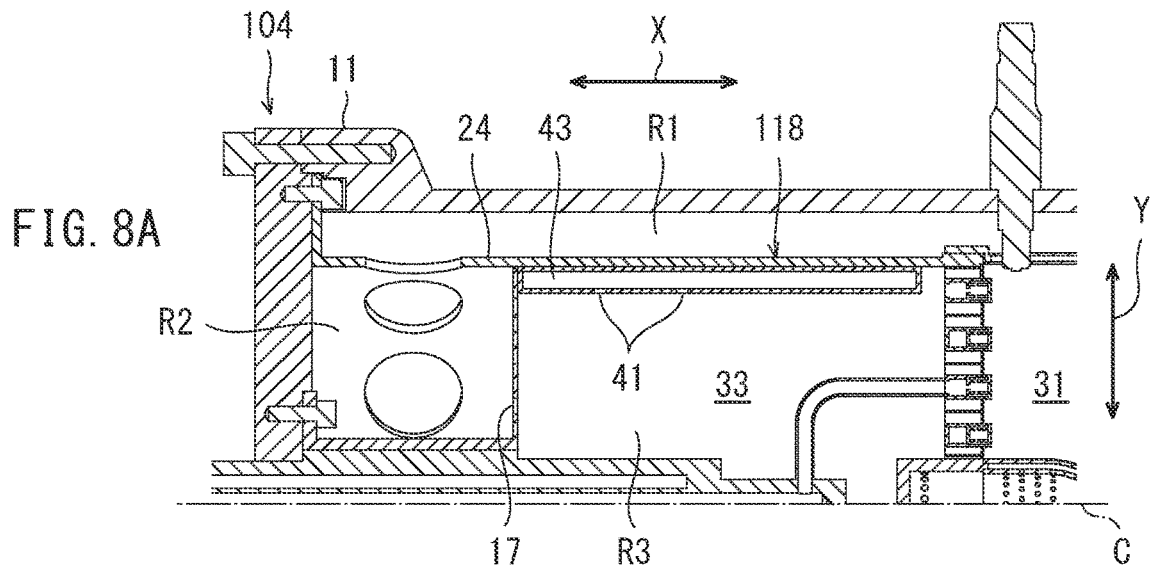
FIG. 8A is a major component sectional view showing a first modified example of the combustor shown in FIG. 3.

FIG. 8A is a major component sectional view showing a first modified example of the combustor 4 shown in FIG. 3. As shown in FIG. 8A, in a combustor 104 of the first modified example, a resonator 118 projects toward the downstream region R3 more than a portion of the support liner 24 which is adjacent to the resonator 18 in the axial direction X. To be specific, an inner peripheral surface of the resonator 118 is located, in the radial direction Y, inside an inner peripheral surface of the portion of the support liner 24 which is adjacent to the resonator 18 in the axial direction X. In the present embodiment, a resonator main body 150 internally fitted to the support liner 24 is located so as to project from the support liner 24 toward the downstream region R3. For example, the outer peripheral surface of the support liner 24 may extend linearly in the axial direction X. Therefore, even when the resonator 118 is located at the support liner 24, the upstream region R1 can be prevented from narrowing. The resonator may be located at an intermediate position between the position of the resonator 18 shown in FIG. 3 and the position of the resonator 118 shown in FIG. 8A.

Figure 8B:
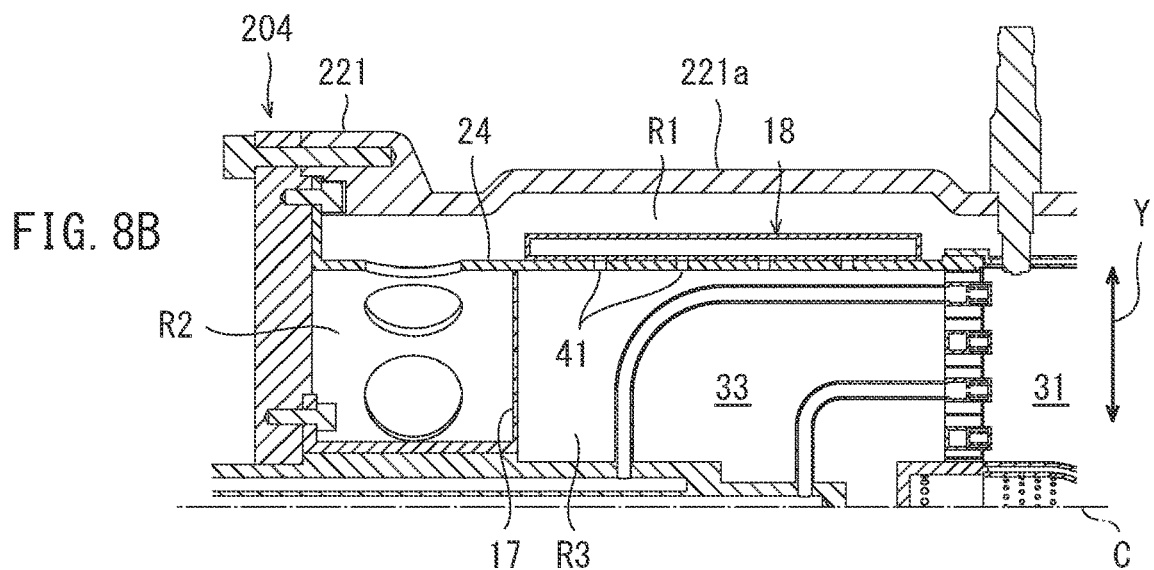
FIG. 8B is a major component sectional view showing a second modified example of the combustor shown in FIG. 3.

FIG. 8B is a major component sectional view showing a second modified example of the combustor 4 shown in FIG. 3. As shown in FIG. 8B, in a combustor 204 of the second modified example, the resonator 18 is the same as that in the above embodiment, but a tubular casing 221 is different from that in the above embodiment. The tubular casing 221 includes a swelling portion 221a which is located at a portion opposed to the resonator 18 in the radial direction Y and increases in diameter outward in the radial direction Y. Therefore, a portion of the upstream region R1 which is located outside the resonator 18 in the radial direction Y can be prevented from narrowing.

Figure 8C:
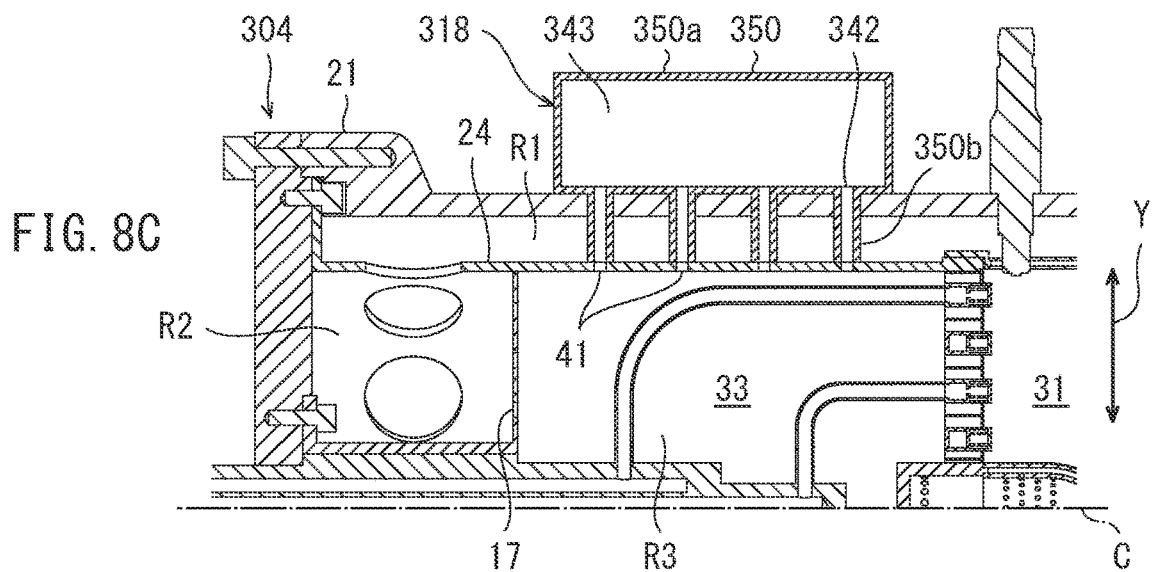
FIG. 8C is a major component sectional view showing a third modified example of the combustor shown in FIG. 3.

FIG. 8C is a major component sectional view showing a third modified example of the combustor 4 shown in FIG. 3. As shown in FIG. 8C, in a combustor 304 of the third modified example, a resonator 318 (third resonator) projects to an outside of the tubular casing 21. The resonator 318 includes a resonator main body 350 connected to the outer peripheral surface of the support liner 24. The resonator main body 350 includes: a hollow portion 350a defining a resonance chamber 343; and tube portions 350b projecting inward in the radial direction Y from the resonator main body 350.

The hollow portion 350a is located outside the tubular casing 21 in the radial direction Y. The tubular casing 21 and the resonator main body 350 contact each other in FIG. 8C but do not have to contact each other. The tube portions 350b penetrate the tubular casing 21 in the radial direction Y, cross the upstream region R1 in the radial direction, and are connected to the support liner 24. The support liner 24 includes through holes which are located on the inner peripheral surface thereof and form the openings 41 facing the downstream region R3. Internal spaces of the tube portions 350b communicate with these through holes. To be specific, the internal space of the tube portion 350b and the through hole of the support liner 24 form a restrictor 342. According to this, the degree of freedom of the volume of the resonance chamber 343 can be increased, and the degree of freedom of the setting of the frequency to be attenuated is improved. For example, the resonance chamber 343 is made large, and the low frequency vibration can be designed to be reduced.

Embodiment 2

Figure 9:
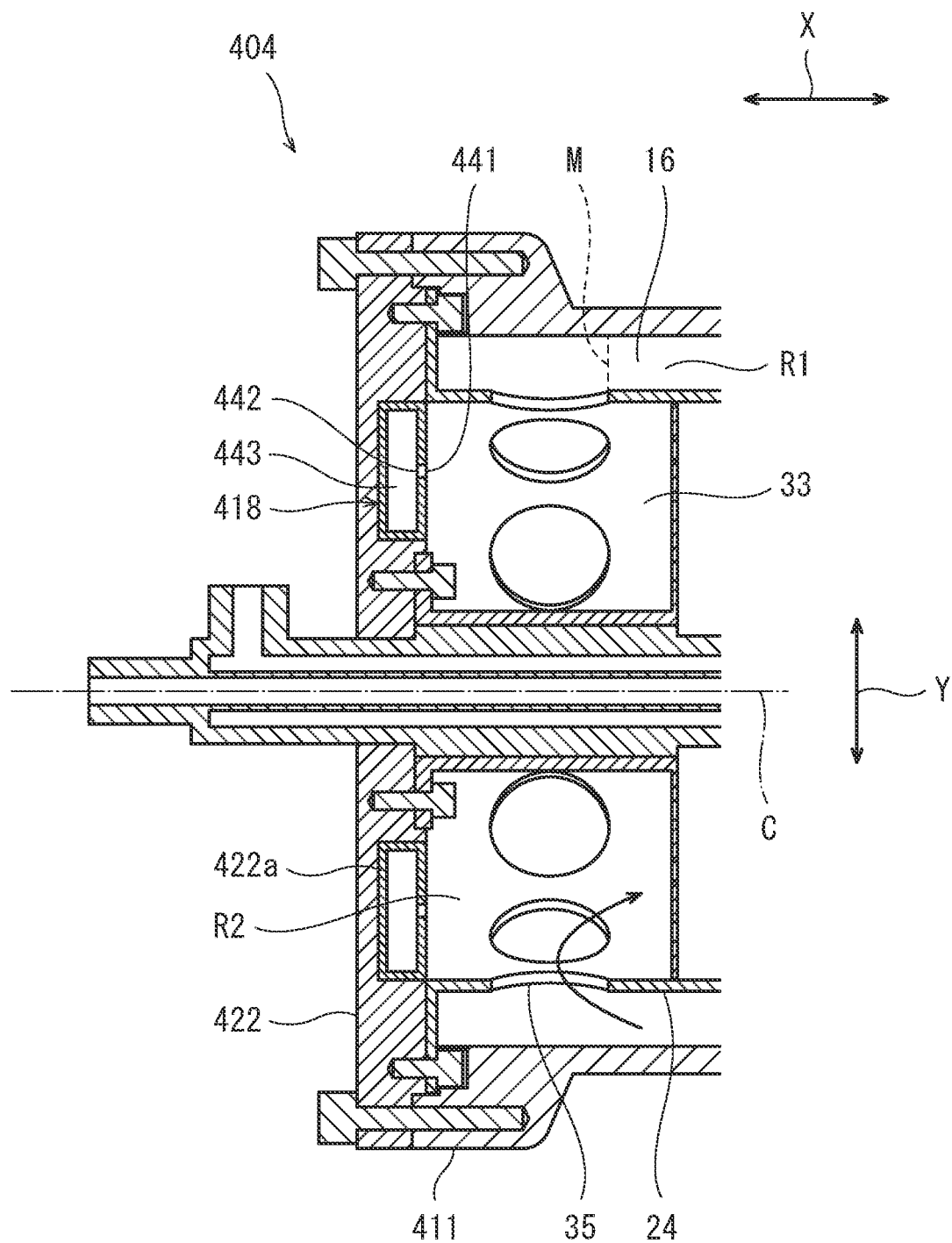
FIG. 9 is a major component sectional view of the combustor of Embodiment 2.

FIG. 9 is a major component sectional view of a combustor 404 of Embodiment 2. As shown in FIG. 9, in the combustor 404, a resonator 418 (second resonator) is located at an end plate 422 of a casing 411. The end plate 422 includes a recess 422a that is opposed to the air chamber 33 and extends annularly around the axis C. The resonator 418 is accommodated in the recess 422a. The resonator 418 is a hollow member having an annular shape similar to the recess 422a.

The resonator 418 includes openings 441, restrictors 442, and a resonance chamber 443. The resonance chamber 443 is an annular hollow space of the resonator 418. Walls of the resonator 418 may be partially omitted, and the resonance chamber 443 may be defined by utilizing a surface of the end plate 422. The openings 441 are located on a surface of the resonator 418 which is opposed to the air chamber 33, and are lined up at intervals in a direction around the axis C. The restrictors 442 are through holes which are located at a wall, opposed to the air chamber 33, of the resonator 418 and make the openings 441 communicate with the resonance chamber 443.

The openings 441 of the resonator 418 directly face the air chamber 33 and are open toward the air chamber 33. The openings 441 are continuous with the direction change region R2. The openings 441 are located at an inside of the air introduction ports 35 in the radial direction Y and are open toward the direction change region R2. The openings 441 are open in the axial direction X so as to face the combustion chamber 31. Specifically, an axis of each opening 441 is substantially parallel to the axis C. An axis of each restrictor 442 extends in the axial direction X.

The area of the passage section of the air passage 16 which is orthogonal to the axial direction X changes at the virtual boundary plane M, and the pressure waves are partially reflected or canceled at a downstream side of the virtual boundary plane M. Therefore, when the openings 441 of the resonator 418 are open toward the direction change region R2, the pressure waves can be effectively absorbed. In addition, since the openings 441 face in the axial direction X, the pressure waves transferred in the axial direction X from the combustion chamber 31 can be effectively absorbed. Only the resonator 418 may be located at the combustor 404, or the resonator 18 of Embodiment 1 (or any of the resonators 118, 218, and 318 of the first to fourth modified examples) may also be used. Since the other components are the same as those in Embodiment 1, explanations thereof are omitted.

Figure 10A:
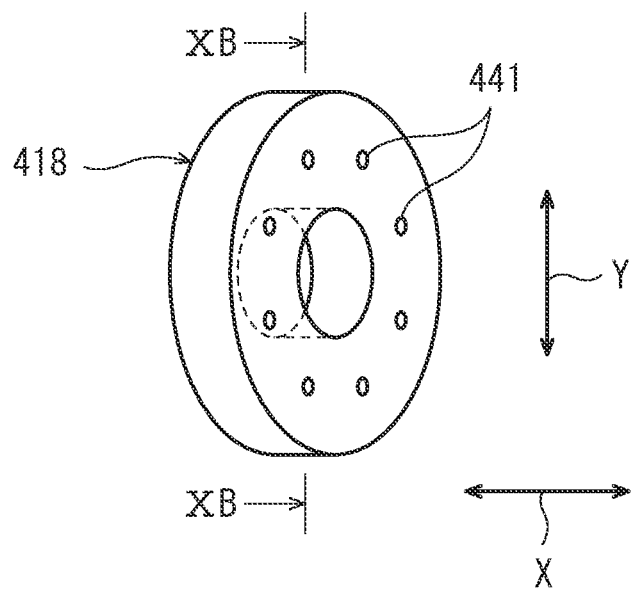
FIG. 10A is a perspective view showing a modified example of the resonator shown in FIG. 9.
Figure 10B:
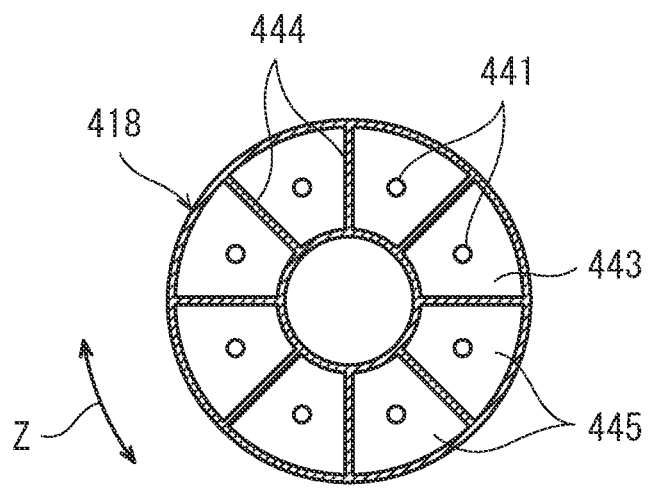
FIG. 10B is a sectional view taken along line XB-XB of FIG. 10A.

FIG. 10A is a perspective view showing a modified example of the resonator 418 shown in FIG. 9. FIG. 10B is a sectional view taken along line XB-XB of FIG. 10A. As shown in FIGS. 10A and 10B, the resonator 418 may include a partition plate 444 that divides the resonance chamber 443 into cavities 445. The cavities 445 communicate with the respective openings 441.

The partition plate 444 divides the resonance chamber 443 in the circumferential direction Z. One opening 441 may communicate with one cavity 445, or the openings 441 may communicate with one cavity 445. The partition plate 444 may have such a shape that each cavity 445 has a fan shape when viewed from the axial direction X.

According to this, even when the sound pressures whose phases are opposite to each other are distributed in the circumferential direction Z, the sound pressures whose phases are opposite to each other are prevented from interfering with each other. Therefore, the reduction in the resonance volume by the interference of the sound pressures can be prevented, and the resonance at a designed frequency can be generated. Each cavity 445 may have such a shape as to be further divided in the radial direction. Even when there is the distribution of the sound pressures whose phases are opposite to each other in the radial direction Y, the interference of the sound pressures whose phases are opposite to each other is prevented by dividing each cavity 445 in the radial direction Y.

Figure 11A:
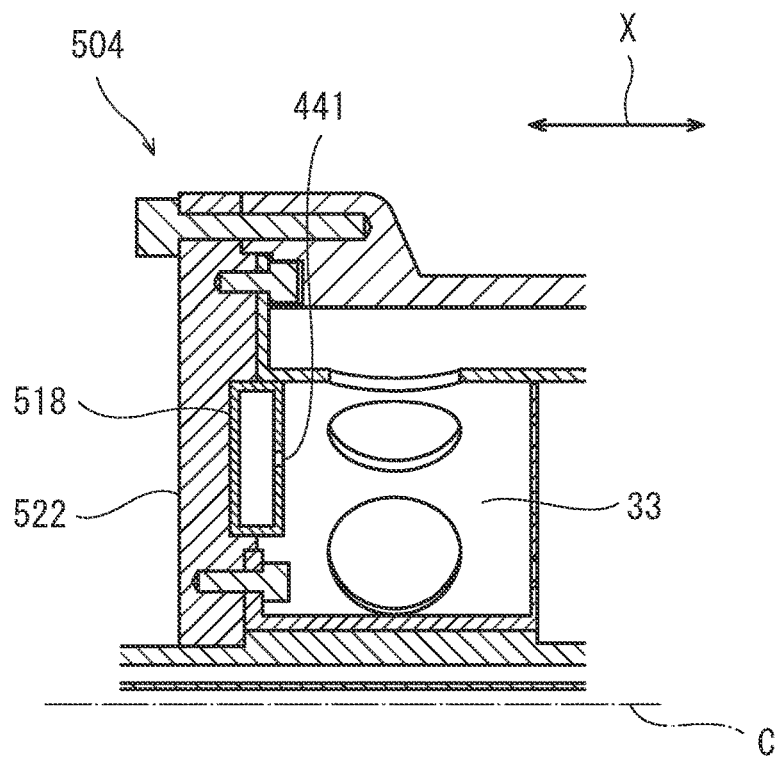
FIG. 11A is a major component sectional view showing a first modified example of the combustor shown in FIG. 9.

FIG. 11A is a major component sectional view showing a first modified example of the combustor 404 shown in FIG. 9. As shown in FIG. 11A, in a combustor 504 of the first modified example, a resonator 518 projects in the axial direction X from an end plate 522 to the air chamber 33. The shape of the resonator 518 itself is the same as the shape of the resonator 418. Therefore, a local reduction in the thickness of the end plate 522 can be mitigated. The entire resonator 518 may be located at the second side of the end plate 522 in the axial direction X, i.e., the entire resonator 518 may be located in the air chamber 33.

Figure 11B:
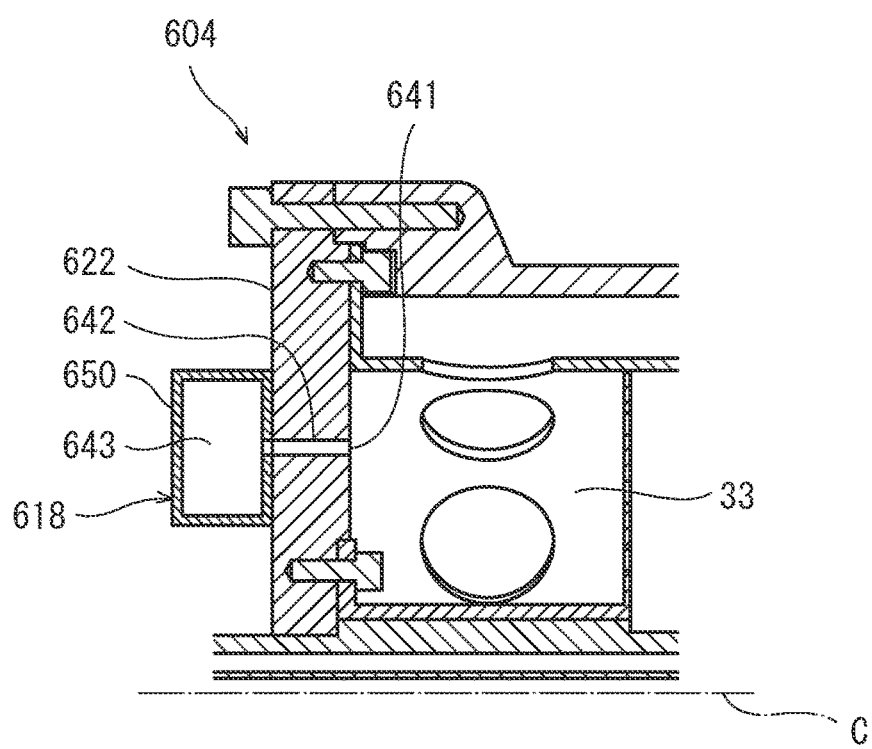
FIG. 11B is a major component sectional view showing a second modified example of the combustor shown in FIG. 9.

FIG. 11B is a major component sectional view showing a second modified example of the combustor 404 shown in FIG. 9. As shown in FIG. 11B, in a combustor 604 of the second modified example, a resonator 618 (third resonator) projects to an outside of an end plate 622. The resonator 618 includes a resonator main body 650 connected to an outer surface of the end plate 622. The resonator main body 650 is located outside the casing 11 and defines therein a resonance chamber 643. The resonator main body 650 and the end plate 622 contact each other in FIG. 11B, but do not have to contact each other. The end plate 622 includes a through hole that communicates with the resonance chamber 643 and extends in the axial direction X.

The through hole of the end plate 622 forms a restrictor 642. A wall (wall that forms part of the restrictor 642) of the resonator main body 650 which is in surface-contact with the end plate 622 may be omitted. Moreover, the resonator main body 650 does not have to be in surface-contact with the end plate 622. The end plate 622 includes an opening 641 which is located on a surface (surface at the second side in the axial direction X) defining the air chamber 33 and serves as an inlet of the restrictor 642. According to this, the degree of freedom of the volume of the resonance chamber 643 can be increased, and the degree of freedom of the setting of the frequency to be attenuated is improved. For example, the resonance chamber 643 is made large, and the low frequency vibration can be designed to be reduced.

Embodiment 3

Figure 12:
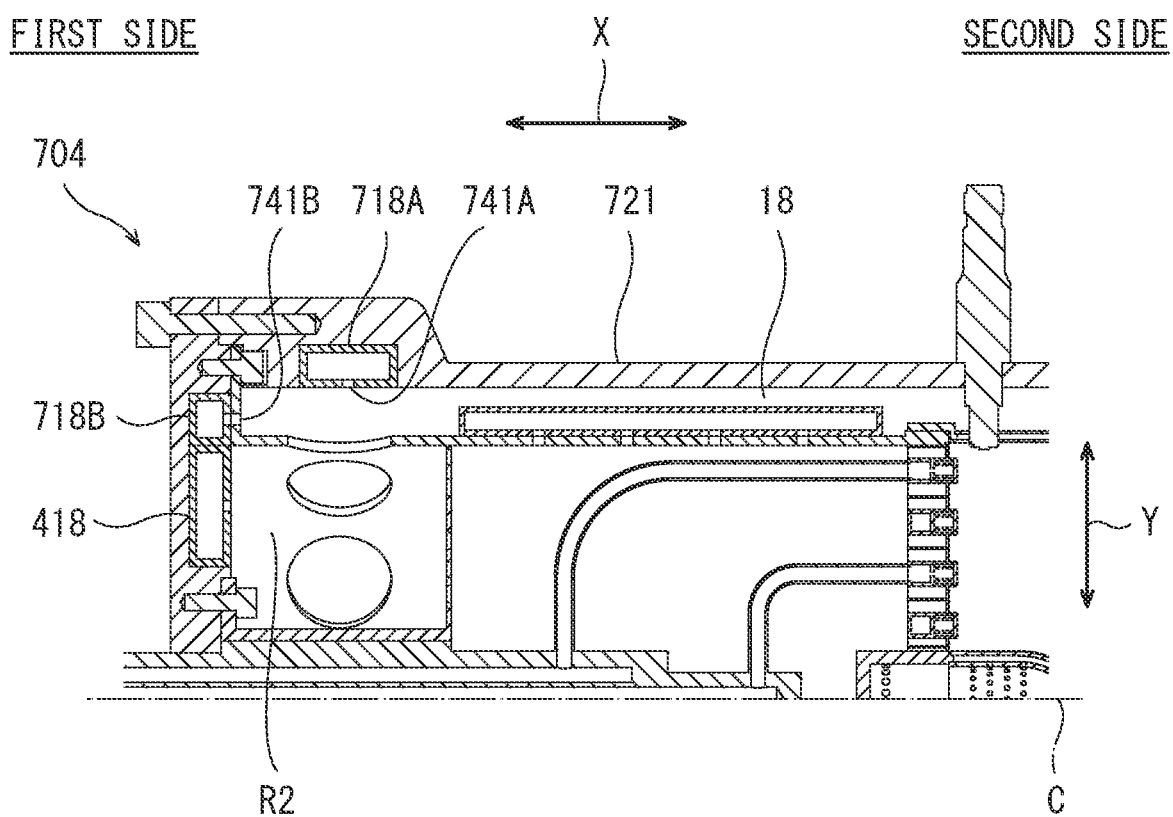
FIG. 12 is a major component sectional view of the combustor of Embodiment 3.

FIG. 12 is a major component sectional view of a combustor 704 of Embodiment 3. As shown in FIG. 12, the combustor 704 includes resonators 718A and 718B that are open toward a portion of the direction change region R2 which is located outside the air introduction ports 35 in the radial direction Y. The resonator 718A is located at a tubular casing 721. An opening 741A of the resonator 718A is located outside the direction change region R2 in the radial direction Y and is open inward in the radial direction Y. The resonator 718B is located at an end plate 722. An opening 741B of the resonator 718B is located at the first side of the direction change region R2 in the axial direction X and is open toward the second side in the axial direction X. The combustor 704 may further include the resonator 18 of Embodiment 1 and may further include the resonator 418 of Embodiment 2. Since the other components are the same as those in Embodiment 1, explanations thereof are omitted.

Figure 13A:
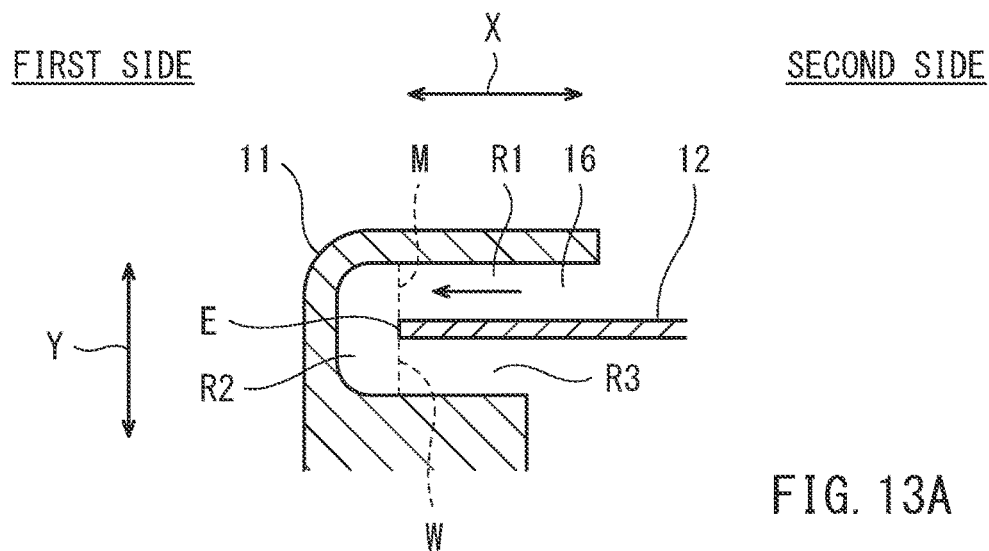
FIGS. 13A to 13C are schematic diagrams showing variations of an air passage of the combustor.
Figure 13B:
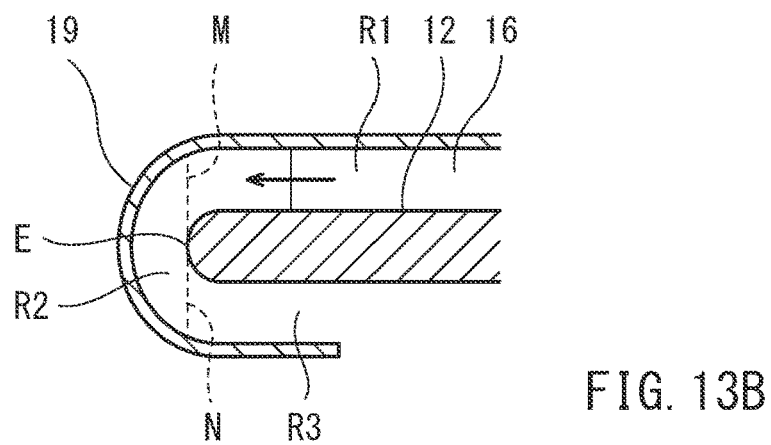
Figure 13C:
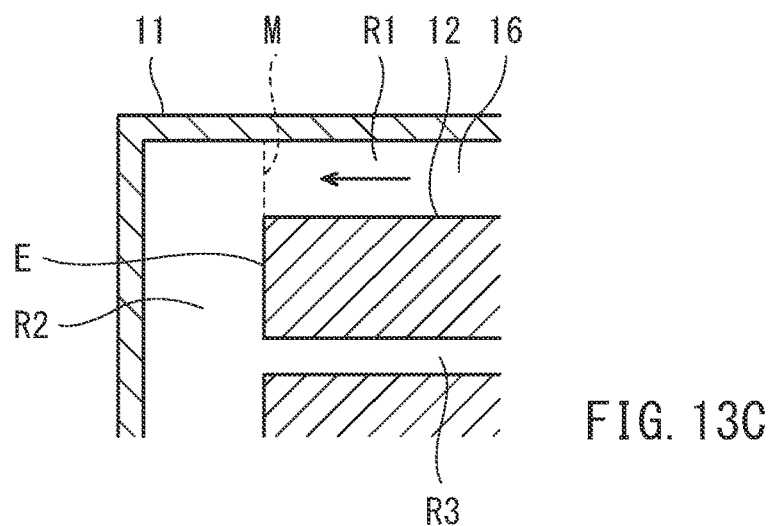

FIGS. 13A to 13C are schematic diagrams showing variations of the air passage 16 of the combustor 4. For ease of understanding, the same reference signs as the components in Embodiment 1 are used for the corresponding components in the present variations even when the shapes of the components are different.

In FIG. 13A, the casing 11 is configured such that each of the upstream region R1, the direction change region R2, and the downstream region R3 has an annular shape extending around the axis of the tubular body 12. In FIG. 13B, the tubular body 12 is covered with a guide member 19 accommodated in a casing (not shown). The guide member 19 is configured such that each of the upstream region R1, the direction change region R2, and the downstream region R3 has an annular shape extending around the axis of the tubular body 12. In FIG. 13C, the casing 11 is configured such that: the direction change region R2 has a columnar shape around the axis of the tubular body 12; and each of the upstream region R1 and the downstream region R3 has an annular shape extending around the axis of the tubular body 12.

In FIGS. 13A to 13C, the virtual boundary plane M between the upstream region R1 and the direction change region R2 is a virtual plane which: passes through the end E, located at the second side in the axial direction X, of a portion of the air passage 16 which extends in the radial direction Y to connect the upstream region R1 to the downstream region R3; and is orthogonal to the axial direction X. The area of the section of the air passage 16 which is orthogonal to the axial direction X changes at the virtual boundary plane M, and openings of a resonator (not shown) are open toward a space of the air passage 16 which is located downstream of the virtual boundary plane M.

Embodiment 4

Figure 14:
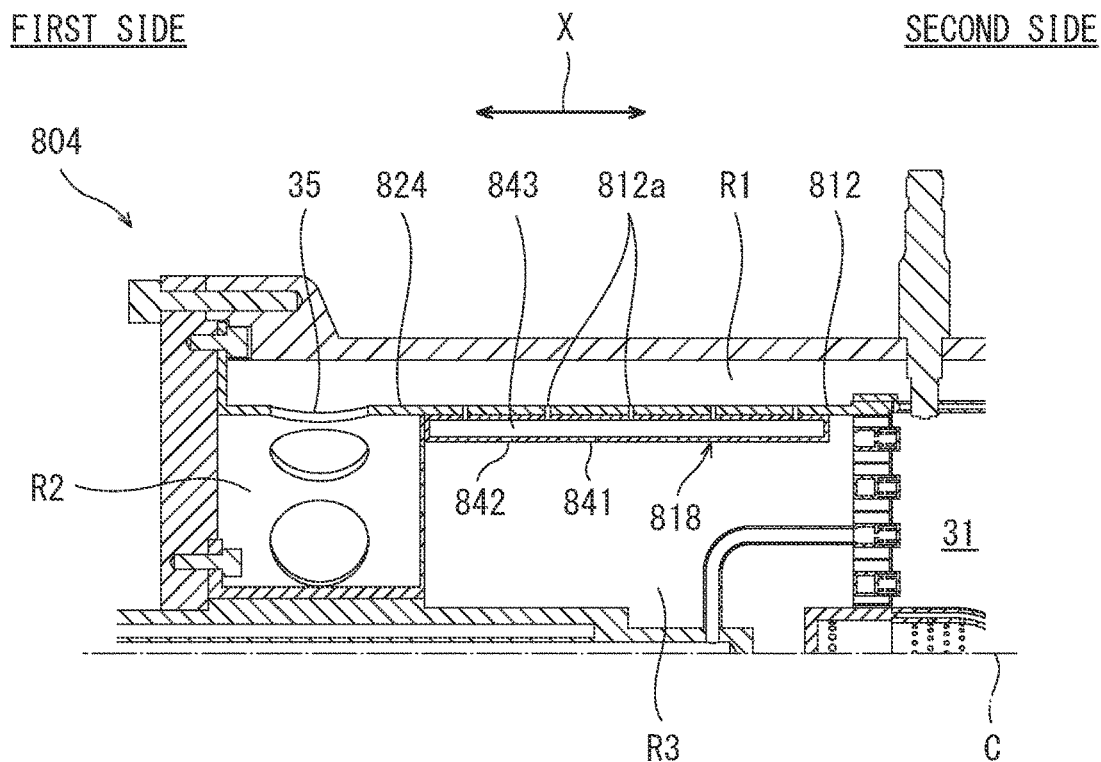
FIG. 14 is a major component sectional view of the combustor of Embodiment 4.

FIG. 14 is a major component sectional view of a combustor 804 of Embodiment 4. As shown in FIG. 14, in the combustor 804, a resonator 818 is located at a tubular body 812 (specifically, a support liner 824) and is open toward the downstream region R3. The tubular body 812 includes leak holes 812a which make a resonance chamber 843 of the resonator 818 communicate with the upstream region R1. The leak holes 812a are located at the second side of the direction change region R2 in the axial direction X. The leak holes 812a make the downstream region R3 communicate with the upstream region R1 through the resonator 818 without through the direction change region R2.

The diameter of each leak hole 812a is not less than 0.1 mm and not more than 10 mm. The diameter of the leak hole 812a is smaller than each of the diameter of an opening 841 of the resonator 818 and the diameter of a restrictor 842 of the resonator 818. Specifically, the diameter of the leak hole 812a may be not less than 1/10 of the height of the leak hole 812a (i.e., the length of a passage axis of the leak hole 812a). Therefore, the pressure waves can be effectively reduced while improving processability by a laser or the like. Moreover, the total opening area of the leak holes 812a may be not more than 1/2 of the sectional area of a plane of the upstream region R1 which is perpendicular to the flow direction. The leak holes 812a can release sound energy from the downstream region R3 to the upstream region R1. Therefore, the vibration generated by the combustion can be further effectively reduced. Since the other components are the same as those in Embodiment 1, explanations thereof are omitted.

The resonator 818 shown in FIG. 14 is similar to the resonator 118 shown in FIG. 8A but may be similar to the resonator 18 shown in FIG. 3 or the resonator 318 shown in FIG. 8C. When the resonator 818 shown in FIG. 14 is similar to the resonator 318 shown in FIG. 8C, the leak holes 812a may be located at the support liner 24 or the tube portion 350b.

Embodiment 5

Figure 15:
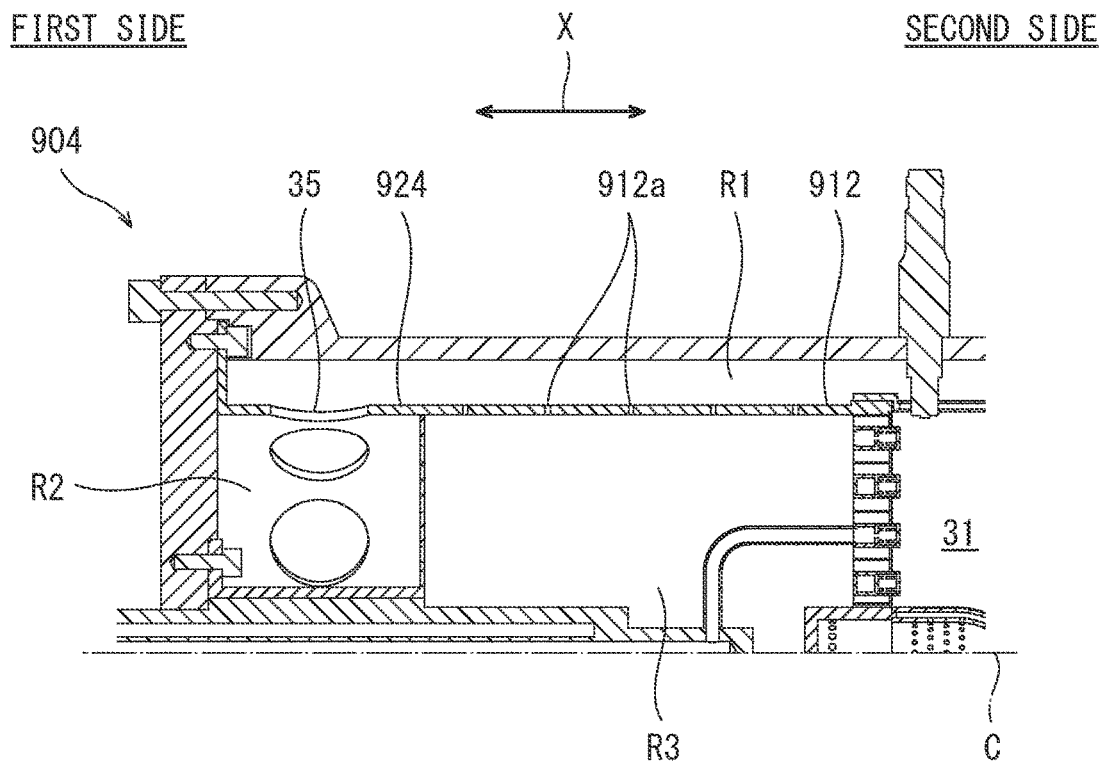
FIG. 15 is a major component sectional view of the combustor of Embodiment 5.

FIG. 15 is a major component sectional view of a combustor 904 of Embodiment 5. As shown in FIG. 15, the combustor 904 does not include a resonator. A tubular body 912 (specifically, a support liner 924) includes leak holes 912a which make the downstream region R3 communicate with the upstream region R1. The leak holes 912a are located at the second side of the direction change region R2 in the axial direction X. The leak holes 912a make the downstream region R3 communicate with the upstream region R1 without through the direction change region R2.

The diameter of each leak hole 912a is not less than 0.1 mm and not more than 10 mm. Specifically, the diameter of the leak hole 912a may be not less than 1/10 of the height of the leak hole 912a (i.e., the length of the passage axis of the leak hole 912a). Therefore, the pressure waves can be effectively reduced while improving processability by a laser or the like. Moreover, the total opening area of the leak holes 912a may be not more than 1/2 of the sectional area of a plane of the upstream region R1 which is perpendicular to the flow direction. The leak holes 912a can release the sound energy from the downstream region R3 to the upstream region R1. Therefore, the vibration generated by the combustion can be effectively reduced without a resonator. Since the other components are the same as those in Embodiment 1, explanations thereof are omitted.

The foregoing has described the embodiments and the modified examples as examples of the technology disclosed in the present application. However, the technology in the present disclosure is not limited to these and is applicable to embodiments in which modifications, replacements, additions, omissions, and the like have been suitably made. Moreover, a new embodiment may be prepared by combining the components described in the above embodiments and the above modified examples. For example, some of components or methods in one embodiment or one modified example may be applied to another embodiment or another modified example. Some components in an embodiment or a modified example may be separated from the other components in the embodiment or the modified example and arbitrarily extracted. Furthermore, the components shown in the attached drawings and the detailed explanations include not only components essential to solve the problems but also components for exemplifying the above technology and not essential to solve the problems.

The following aspects disclose preferred embodiments.

First Aspect

A gas turbine combustor including:
  a tubular body that defines a combustion chamber, extends from a first side to a second side in an axial direction, and defines a discharge port located at the second side in the axial direction;

an air passage through which air is supplied to the combustion chamber; and at least one resonator including
  at least one opening that is open toward the air passage and
  a resonance chamber that communicates with the opening, wherein:
the air passage includes
  an upstream region that extends along an outer peripheral surface of the tubular body,
  a downstream region that extends along an inner peripheral surface of the tubular body, is located at the first side of the combustion chamber in the axial direction, and communicates with the combustion chamber, and
  a direction change region that connects the upstream region to the downstream region in a radial direction of the tubular body and is adjacent to the upstream region such that an area of a section of the air passage which is orthogonal to the axial direction changes at a position between the upstream region and the direction change region; and
the opening of the resonator is open toward a space of the air passage which is located downstream of the upstream region.

Second Aspect

The gas turbine combustor according to the first aspect, wherein:
  the at least one resonator includes a first resonator; and
  the opening of the first resonator is open toward the downstream region of the air passage.

Third Aspect

The gas turbine combustor according to the second aspect, wherein the first resonator is located at the tubular body.

Fourth Aspect

The gas turbine combustor according to the third aspect, wherein an outer peripheral surface of the first resonator is located, in the radial direction, outside an outer peripheral surface of a portion of the tubular body which is adjacent to the first resonator in the axial direction.

Fifth Aspect

The gas turbine combustor according to the third or fourth aspect, wherein an inner peripheral surface of the first resonator is located, in the radial direction, inside an inner peripheral surface of a portion of the tubular body which is adjacent to the first resonator in the axial direction.

Sixth Aspect

The gas turbine combustor according to any one of the first to fifth aspects, wherein:
  the at least one resonator includes a second resonator; and
  the opening of the second resonator is open toward the direction change region.

Seventh Aspect

The gas turbine combustor according to the sixth aspect, further including an end plate that is located at the first side of the tubular body in the axial direction and includes an inner surface facing the air passage, wherein
  the second resonator is located at the end plate.

Eighth Aspect

The gas turbine combustor according to any one of the first to seventh aspects, further including a casing that accommodates the tubular body, wherein:
  an air introduction passage including the upstream region is located between the casing and the tubular body;

the tubular body includes
  a first liner that defines the combustion chamber and
  a second liner that is adjacent to the first liner at the first side in the axial direction and defines an air chamber including the downstream region; and
the opening of the at least one resonator is open toward the air chamber.

Ninth Aspect

The gas turbine combustor according to any one of the first to eighth aspects, further including a straightening plate that includes a straightening hole and divides the space, located downstream of the upstream region, of the air passage into a pre-straightening space and a post-straightening space, wherein
  the opening of the at least one resonator is open toward the post-straightening space.

Tenth Aspect

The gas turbine combustor according to any one of the first to ninth aspects, wherein the resonance chamber of the at least one resonator is located outside the casing.

Eleventh Aspect

The gas turbine combustor according to any one of the first to tenth aspects, wherein:
  the at least one opening includes openings that are lined up in the axial direction and a circumferential direction extending around the axial direction; and
  the at least one resonator includes a partition plate that divides the resonance chamber into cavities communicating with the respective openings and divides the resonance chamber in the circumferential direction.

Twelfth Aspect

The gas turbine combustor according to the eleventh aspect, wherein the partition plate further divides the resonance chamber in the axial direction or the radial direction.

Fourteenth Aspect

The gas turbine combustor according to any one of the first to twelfth aspects, wherein the tubular body includes a leak hole that makes the downstream region communicate with the upstream region without through the direction change region.

Fifteenth Aspect

A gas turbine combustor including:
  a tubular body that defines a combustion chamber, extends from a first side to a second side in an axial direction, and defines a discharge port located at the second side in the axial direction; and
  an air passage through which air is supplied to the combustion chamber, wherein:
the air passage includes
  an upstream region that extends along an outer peripheral surface of the tubular body,
  a downstream region that extends along an inner peripheral surface of the tubular body, is located at the first side of the combustion chamber in the axial direction, and communicates with the combustion chamber, and
  a direction change region that connects the upstream region to the downstream region in a radial direction of the tubular body; and
the tubular body includes a leak hole that makes the downstream region communicate with the upstream region without through the direction change region.

The invention claimed is:
1. A gas turbine combustor comprising:
  a tubular body that defines a combustion chamber, extends from a first side to a second side in an axial direction, and defines a discharge port located at the second side in the axial direction;

an air passage through which air is supplied to the combustion chamber;

a straightening plate, and at least one resonator including at least one opening that is open toward the air passage and a resonance chamber that communicates with the opening, wherein:

the air passage includes an upstream region that extends along an outer peripheral surface of the tubular body, a downstream region that extends along an inner peripheral surface of the tubular body, is located at the first side of the combustion chamber in the axial direction, and communicates with the combustion chamber, and a direction change region that connects the upstream region to the downstream region in a radial direction of the tubular body and is adjacent to the upstream region such that an area of a section of the air passage which is orthogonal to the axial direction changes at a position between the upstream region and the direction change region; and the opening of the resonator is open toward a space of the air passage which is located downstream of the upstream region, the straightening plate includes a straightening hole and divides the space, located downstream of the upstream region, of the air passage into a pre-straightening space and a post-straightening space;

the opening of the at least one resonator is open toward the post-straightening space; and the straightening plate is annular such that a circumference of the straightening plate is adjacent to the tubular body.

2. The gas turbine combustor according to claim 1, wherein:

the at least one resonator comprises a first resonator; and the opening of the first resonator is open toward the downstream region of the air passage.

3. The gas turbine combustor according to claim 2, wherein the first resonator is located at the tubular body.

4. The gas turbine combustor according to claim 3, wherein:

the first resonator includes an inner peripheral surface extending in a circumferential direction extending circumferentially around an axis of the tubular body; and the inner peripheral surface of the first resonator is located, in the radial direction, inside a portion of the inner peripheral surface of the tubular body which is adjacent to the first resonator in the axial direction.

5. The gas turbine combustor according to claim 1, wherein:

the at least one resonator comprises a second resonator; and the opening of the second resonator is open toward the direction change region.

6. The gas turbine combustor according to claim 5, further comprising an end plate that is located at the first side of the tubular body in the axial direction and includes an inner surface facing the air passage, wherein the second resonator is located at the end plate.

7. The gas turbine combustor according to claim 1, further comprising a casing that accommodates the tubular body, wherein:

the air passage includes an air introduction passage including the upstream region and located between the casing and the tubular body;

the tubular body includes a first liner that defines the combustion chamber and a second liner that is adjacent to the first liner at the first side in the axial direction and defines an air chamber including the downstream region; and the opening of the at least one resonator is open toward the air chamber.

8. The gas turbine combustor according to claim 1, wherein the resonance chamber of the at least one resonator is located outside the casing.

9. The gas turbine combustor according to claim 1, wherein:

the at least one opening comprises openings that are lined up in the axial direction and a circumferential direction extending around the axial direction; and the at least one resonator includes a partition plate that divides the resonance chamber into cavities communicating with the respective openings and divides the resonance chamber in the circumferential direction.

10. The gas turbine combustor according to claim 9, wherein the partition plate further divides the resonance chamber in the axial direction.

11. The gas turbine combustor according to claim 1, wherein the tubular body includes a leak hole that makes the downstream region communicate with the upstream region without through the direction change region.

12. A gas turbine combustor comprising:

a tubular body that defines a combustion chamber, extends from a first side to a second side in an axial direction, and defines a discharge port located at the second side in the axial direction;

an air passage through which air is supplied to the combustion chamber; a straightening plate; and at least one resonator including at least one opening that is open toward the air passage and a resonance chamber that communicates with the opening, wherein:

the air passage includes an upstream region that extends along an outer peripheral surface of the tubular body, a downstream region that extends along an inner peripheral surface of the tubular body, is located at the first side of the combustion chamber in the axial direction, and communicates with the combustion chamber, and a direction change region that connects the upstream region to the downstream region in a radial direction of the tubular body and is adjacent to the upstream region such that an area of a section of the air passage which is orthogonal to the axial direction changes at a position between the upstream region and the direction change region;

the opening of the resonator is open toward a space of the air passage which is located downstream of the upstream region;

the at least one resonator comprises a first resonator located at the tubular body and including an outer peripheral surface extending in a circumferential direction extending circumferentially around an axis of the tubular body; and the opening of the first resonator is open toward the downstream region of the air passage; the straightening plate is annular such that a circumference of the straightening plate is adjacent to the tubular body and the outer peripheral surface of the first resonator is located, in the radial direction, outside a portion of the outer peripheral surface of the tubular body which is adjacent to the first resonator in the axial direction.

* * * * *